US005920133A

United States Patent [19]

Penswick et al.

[11] Patent Number: 5,920,133

[45] Date of Patent: Jul. 6, 1999

[54] FLEXURE BEARING SUPPORT ASSEMBLIES, WITH PARTICULAR APPLICATION TO STIRLING MACHINES

[75] Inventors: Laurence B. Penswick, Richland; Donald C. Lewis; Ronald W. Olan, both of Kennewick; Brad Ross, West Richland; Leon Montgomery, Richland, all of Wash.

[73] Assignee: Stirling Technology Company, Kennewick, Wash.

[21] Appl. No.: 08/705,432

[22] Filed: Aug. 29, 1996

[51] Int. Cl.[6] .......................... H02K 7/00; H02K 33/00; H02K 33/02; F25B 9/00

[52] U.S. Cl. .................................. 310/17; 310/15; 62/6

[58] Field of Search ......................... 310/15, 17; 60/517, 60/520; 62/6

[56] References Cited

U.S. PATENT DOCUMENTS

| | | | |
|---|---|---|---|
| 3,240,073 | 3/1966 | Pitzer | 267/161 |
| 4,475,335 | 10/1984 | Davey | 60/520 |
| 5,146,124 | 9/1992 | Higham et al. | 310/17 |
| 5,211,372 | 5/1993 | Smith, Jr. | 251/75 |
| 5,255,521 | 10/1993 | Watanabe | 62/6 |
| 5,315,190 | 5/1994 | Nasar | 310/12 |
| 5,351,490 | 10/1994 | Ohishi et al. | 62/6 |
| 5,469,291 | 11/1995 | Plesko | 359/224 |
| 5,492,313 | 2/1996 | Pan et al. | 62/6 |
| 5,522,214 | 6/1996 | Beckett et al. | 60/517 |
| 5,642,618 | 7/1997 | Penswick | 60/520 |
| 5,647,217 | 7/1997 | Penswick et al. | 62/6 |

FOREIGN PATENT DOCUMENTS

| | | | |
|---|---|---|---|
| 0 043 249 A2 | 1/1982 | European Pat. Off. | F02G 1/06 |
| 0 086 622 A1 | 8/1983 | European Pat. Off. | F02G 1/043 |
| 0 553 818 A1 | 8/1993 | European Pat. Off. | F25B 9/14 |
| WO 90/12961 | 11/1990 | WIPO | F04B 35/04 |

*Primary Examiner*—Clayton LaBalle

*Attorney, Agent, or Firm*—Wells, St. John, Roberts, Gregory & Matkin, P.S.

[57] ABSTRACT

Improved flexures and flexure assemblies are taught for use in thermal regenerative machines. In one aspect, the flexure is a flat spring formed from a flat metal sheet having kerfs forming axially movable arms across them, and at least one aperture communicating with and extending from an end portion of the kerf. One variation includes a flexure bearing assembly having such a flexure. In accordance with another aspect, a thermodynamic machine has a housing carried stator and a piston and linear moving element carried by a flexure bearing assembly. In accordance with yet another aspect, a piston and displacer assembly are configured to be movably supported together within a chamber in a housing of a thermal regenerative machine via a flexure assembly. In accordance with yet another aspect, an internally mounted flexure bearing assembly includes a body configured to carry a tubular member, with the tubular member further carrying a central moving axial member within the tubular member via a flexure assembly in the form of at least one flat spring. One variation includes a retaining member for retaining the flat springs in assembly.

39 Claims, 9 Drawing Sheets

FLEXURE BEARING SUPPORT ASSEMBLIES, WITH PARTICULAR APPLICATION TO STIRLING MACHINES

TECHNICAL FIELD

This invention relates to power conversion machinery, such as a compressor, Stirling cycle engine or heat pump, and more particularly to improved internally mounted flexure bearing assemblies for coaxial non-rotating linear reciprocating members used in power conversion machinery.

BACKGROUND OF THE INVENTION

Non-rotating linear reciprocating members for thermal regenerative machines, particularly for ones being used with Stirling Cycle machines, are subjected in use to extended periods of cyclical operation. One or more reciprocating members are typically formed in a Stirling Cycle Machine. Sliding seals and gas springs have been incorporated into such machines in order to form suitable reciprocating members. For example, Stirling cycle machines incorporate reciprocating elements with associated internal and/or external seals.

A typical application for internally mounted flexural bearing assemblies in power conversion machinery is found on a Stirling cycle electric power generator. One typical configuration of this generator has a movable displacer contained within an enclosed working chamber. The displacer forms a movable piston within the generator housing, transferring working fluid back and forth between a compression space (a low temperature space) and an expansion space (a high temperature space). A power extraction piston is provided in fluid communication with the compression space. Additionally, a fluid flow path transfers working fluid from the expansion space to the compression space through a gas heater, a regenerator, and a gas cooler, respectively.

Heat is applied to the heater head, causing the displacer to reciprocate within a cylinder between the compression and expansion spaces. As a result, working fluid is transferred cyclically back and forth through the internal heat exchangers. The working gas is cooled as it flows through the gas cooler, adjacent to the compression space, and heated as it flows through the gas heater, adjacent to the expansion space. Depending on the direction of fluid flow, the regenerator acts as an energy storage device that extracts heat from the gas passing from the gas heater to the gas cooler, and stores it for about one-half of an engine cycle. The stored heat is returned to the gas one-half cycle later as the gas flows from the gas cooler to the gas heater. External heat is supplied to the gas heater at the hot end where heat is applied by a source to the exterior of the heater head. Pressure oscillations in the compression chamber (low temperature space) cause the working piston of the linear alternator to reciprocate, creating a source of electrical power therefrom.

However, presently available construction techniques have proven costly, often requiring large amounts of machining to produce assembled components that realize desired alignment of parts upon assembly. Furthermore, present techniques often result in part assemblies that produce stack up of errors in toleranced dimensions. Also, such techniques prove difficult to manufacture and assemble. Additionally, many thermal regenerative machines have at least two independent free piston reciprocating members that cooperate, in operation, to transfer energy between an electric and a thermal state. Therefore, improvements in flexure bearing assemblies are needed.

Improvements have been made to more effectively use the Stirling cycle working space in the compression space of Stirling cycle engines and coolers. Instead of forming the displacer directly from the linear reciprocating member within such a Stirling device, attempts have been made to spring the displacer onto the working piston of the linear alternator, or alternatively, a linear drive motor. Such techniques have involved mounting the displacer via a gas spring onto the piston of the associated power generator or electric motor. Therefore, the more-traditional construction of a pair of free-pistons that communicate solely through the mutual fluid communication of a working gas is further modified to provide communication through a more self-contained arrangement of gas springs. Such construction provides a more effective use of the Stirling cycle working space in the compression space of a Stirling cycle device. Hence, reduced dead volume is provided within the device. Additionally, the manufacture of the cylinders and seals is somewhat simplified due to a reduction in required machining tolerances and/or in the number of concentric parts needed to be configured in an assembly. However, such a gas-spring arrangement of dual pistons results in a mechanical configuration that has a complex system dynamics. Furthermore, it proves difficult to properly size the displacer relative to the gas spring.

The present invention arose from an effort to simplify the manufacture of Stirling cycle machines and to improve the implementation of flexural bearings and clearance seals in such devices. More particularly, low cost assembly techniques for free piston Stirling cycle devices are desirable to provide a Stirling cycle device which can be manufactured at a lower cost, which is more readily and easily assembled, significantly reduces the machining of components, enables the use of reduced weight assemblies while still providing for utilization of flexural bearing assemblies, provides for the springing of displacers to pistons while reducing the complexity of the system dynamics produced by springing the displacer to the piston of a Stirling cycle device, has a long service life and is rugged, durable, reliable, of simplified design and of relatively economical manufacture and assembly.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
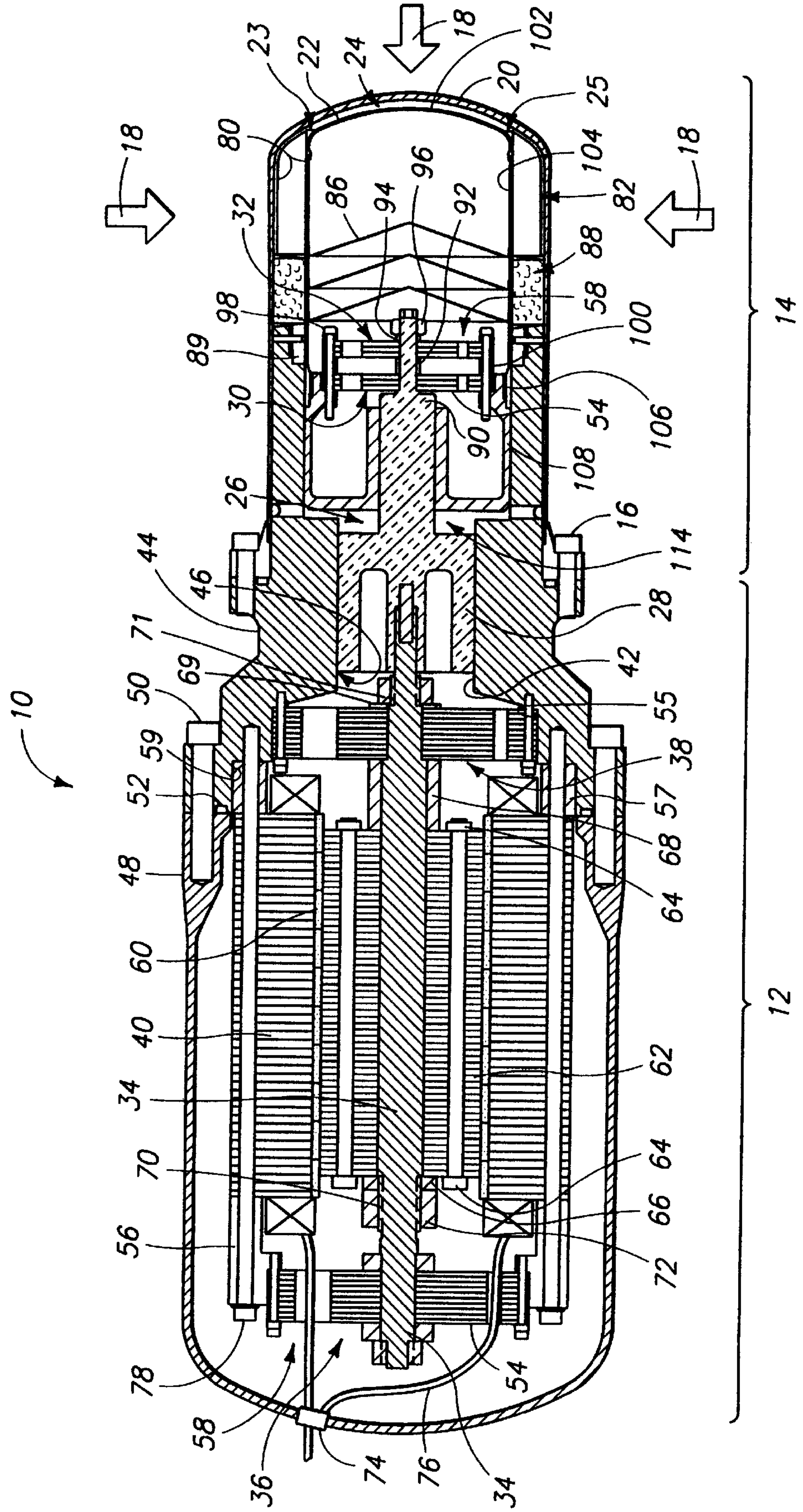
FIG. 1 is a vertical sectional view of a Stirling engine generator having improved flexural bearing support assembly features embodying this invention.

This disclosure of the invention is submitted in furtherance of the constitutional purposes of the U.S. Patent Laws "to promote the progress of science and useful arts" (Article 1, Section 8).

In accordance with one aspect of this invention, a flexure is taught for use in an internally mounted flexure bearing assembly for supporting coaxial non-rotating first and second linear reciprocating members in power conversion machinery. The flexure has a flat spring formed from a flat metal sheet having kerfs forming axially movable arms across them. The flexure also has at least one aperture communicating with and extending from an end portion of the kerf. The flat spring includes radially spaced connections for connecting in assembly to the first and the second member, respectively. The assembled spring accommodates relative axial movement between the first and the second members while maintaining the first and the second members in coaxial alignment. In a related aspect, a flexure bearing assembly having the flexure is also taught.

In accordance with another aspect of this invention, a thermodynamic machine is taught. The machine includes a housing having an internal chamber and a stator having a central bore, the stator carried by the housing. The machine also includes a linear moving element supported for reciprocation within the stator central bore, a piston carried by the linear moving element for reciprocation within a cylinder bore of the chamber, and at least one flexure bearing assembly including radially spaced connections for connecting in assembly to the linear moving element and the stator, respectively, for accommodating relative axial movement between the stator and the element.

In accordance with even another aspect of this invention, a piston and displacer assembly are configured to be movably supported within a chamber in a housing of a thermal regenerative machine. The assembly includes a piston constructed and arranged to communicate with a working gas in the chamber, and supported for reciprocation within a bore of the chamber. A displacer is also constructed and arranged to communicate with the working gas in the chamber, and is supported for reciprocation within a bore of the chamber. Furthermore, the assembly includes at least one flexure bearing assembly including radially spaced connections for connecting in assembly to the piston and the displacer, respectively, for accommodating relative axial movement between the piston and the displacer.

In accordance with yet another aspect of this invention, an internally mounted flexure bearing assembly is taught for use with coaxial non-rotating linear reciprocating members in power conversion machinery. The assembly has an axial member centered about a reference axis and a tubular member having a hollow interior structure. The axial member extends within the hollow interior structure of the tubular member. Additionally, the assembly includes a body configured to carry the tubular member and a flexure in the form of at least one flat spring positioned across the hollow interior structure of the tubular member. The flat spring includes radially spaced connections for securing the flat spring to be carried by the axial member and the tubular member, respectively, for accommodating relative axial movement between the axial member and the tubular member.

In accordance with yet another aspect of this invention, an internally mounted flexure bearing assembly is taught for use with coaxial non-rotating linear reciprocating members in power conversion machinery. The assembly has a first member centered about a reference axis, and a coaxial second member having a hollow interior structure. The first member extends within the hollow interior structure of the second member. A plurality of flat springs are provided in the assembly, each formed from a flat metal sheet having kerfs forming axially movable arms across them, the flat spring including radially spaced inner and outer peripheries for facilitating mounting to the first and the second members, respectively. The assembly includes a retaining member constructed and arranged to retain the plurality of flat springs in a stacked configuration so as to form a pre-fabricated assembly that mates in assembly with the first and the second mating members.

A preferred embodiment of a free piston Stirling cycle device having improved flexural bearing support assemblies referred to as a Stirling power generator is generally designated with reference numeral 10 in FIG. 1. Power generator 10 is formed by joining together a power module 12 and an engine module 14 with a plurality of circumferentially spaced apart threaded fasteners 16. The inside of power generator 10 is filled with a charge of pressurized thermodynamic working fluid such as Helium. Alternatively, hydrogen or any of a number of suitable thermodynamically optimal working fluids can be used to fill and charge generator 10. Exemplary working pressures for the working fluid are in the range of about 100 psi to 3000 psi. In operation, a heat source 18 applies heat to a heater head 20 of the displacer module 14, causing power module 12 to generate a supply of electric power. A displacer 22, comprising a movable displacer piston, reciprocates in operation between a hot space 24 and a cold space 26 in response to thermodynamic heating of the hot space from heater head 20 via heat source 18. In operation, displacer 22 moves working gas between the hot and cold spaces 24 and 26. A power piston 28, suspended to freely reciprocate within power module 12 and in direct fluid communication with working gas within cold space 26, moves in response to cyclic pressure variations within the cold space caused by reciprocation of displacer 22. Piston 28 is fixedly mounted to rod 34 via a double-ended, threaded rod which facilitates assembly and maintenance.

According to the novel aspects of this invention, displacer 22 is supported for reciprocation by power piston 28 via a pair of flexure bearing assemblies 30 and 32. Also according to the novel aspects of this invention, piston 28 is supported for reciprocation on alternator shaft 34 via flexure bearing assemblies 36 and 38. Each assembly 30, 32, 36 and 38 is mounted to an associated support structure via a plurality of circumferentially spaced-apart threaded fasteners. More particularly, assembly 36 is supported, or carried by an array of stationary iron laminations 40. Laminations 40 form part of a linear alternator of power module 12, and provide a tubular member in assembly. Alternatively, laminations 40 form part of a linear motor. Even further, according to the novel aspects of this invention, flexure bearing assemblies 30, 32 and 36, 38 can be formed with a reduced weight flexure construction. Alternatively, a standard flexure construction can be used.

With the exception of the above-mentioned novel aspects, a Stirling cycle machine similar to power generator 10 is disclosed in our U.S. patent application Ser. No. 08/637,923, filed on May 1, 1996 and entitled "Heater Head and Regenerator Assemblies for Thermal Regenerative Machines", listing inventors as Laurence B. Penswick and Ray Erbeznik. This Ser. No. 08/637,923 application, which is now U.S. Pat. No. ___, is hereby incorporated by reference.

According to the device of FIG. 1, Stirling power generator 10 is configured as a portable power generator. Alternatively, generator 10 can be a stationary power generator. Further alternatively, remote power generator 10 can be reconfigured such that power module 12 is supplied with a source of electrical current to produce an electric motor, and displacer module 14 can be reconfigured to run in response to cyclic pressure waves created by the electric motor so as to form a cold head in the region of head 20, producing a cooling effect generally in the region of heat source 18.

A variety of different heat sources 18 can be used to drive the power generator 10 of FIG. 1. A fiber matrix burner that burns natural gas, propane, or some other flammable gas or fuel can be used to heat head 20. A cavity in the burner is shaped to receive head 20, transferring heat primarily by radiation to head 20. Such a burner construction is disclosed in Applicant's co-pending U.S. patent application Ser. No. 08/332,546, entitled "Hybrid Solar Power Receiver for Heat Engines", herein incorporated by reference. Alternatively, a more traditional convective burner fired by natural gas, propane, fossil or synthetic fuels, a solid biomass burner, a solar heater, or a nuclear fueled heat source could be used.

As depicted in FIG. 1, power module 12 includes a linear alternator that is driven by reciprocating motion of power piston 28 within a receiving bore 42 of a power module housing 44. A clearance seal 46 is formed between piston 28 and bore 42, enabling displacer induced cyclic pressure waves to act on piston 28 via working fluid sealed within internal cavities of power generator 10. An elongated end cap 48 mounts to an end of housing 44 with fasteners 50, enabling internal access when assembling and maintaining the alternator. A resilient elastomeric seal 52 is positioned between end cap 48 and housing 44, sealing them together under the compressive force of secured fasteners 50. Alternatively, end cap 48 can be welded to housing 44 to provide a hermetically sealed assembly. Piston 28 is carried by alternator shaft 34 in accurate axial reciprocation via the pair of flexure bearing assemblies 36 and 38. Each assembly is formed from a stack of flat springs 54 described in further detail below with respect to FIGS. 8 and 9.

According to FIG. 1, flexure assembly 38 is retained along an outer periphery directly to housing 30 within circumferential receiving groove 55, thereby supporting alternator shaft 34 at a first end. Flexure assembly 36 is retained along an outer periphery via a mounting ring 56 to the stack of stationary iron laminations 40. Furthermore, the laminations 40 are secured in assembly between the outer mounting ring 56 and a similar mounting ring 57 that seats in contact with body 44 via a shoulder formed by a groove 59 to support the entire assembly. Details of flat spiral springs according to the construction depicted in FIG. 9 are disclosed in Applicant's co-pending U.S. patent application Ser. No. 08/105,156, entitled "Improved Flexure Bearing Support, With Particular Application to Stirling Machines", herein incorporated by reference, now U.S. Pat. No. 5,522,214, issued Jun. 4, 1996. Details of improved springs constructed according to FIGS. 1 and 8 include apertures 58 that serve to reduce weight while maintaining a given spring constant, and while facilitating fluid passage and wire routing.

Construction details of the linear alternator of power module 12 are disclosed in Applicant's U.S. Pat. No. 5,315,190, entitled "Linear Electrodynamic Machine and Method of Using Same", herein incorporated by reference. The array of stationary iron laminations 40 are secured at one end via fasteners 50 to housing 44. The stationary laminations 40 form a plurality of spaced apart radially extending stationary outer stator lamination sets defining a plurality of stator poles, winding slots, and magnetic receiving slots. An array of annular shaped magnets 60 are bonded to the inner diameter of stationary laminations 40 for the purpose of producing magnetic flux. Accordingly, each magnet 60 is received and mounted within the plurality of magnet receiving slots. Furthermore, the magnets have an axial polarity.

An array of moving iron laminations 62 are secured to shaft 34, such that the shaft and laminations move in reciprocating motion along with piston 28 of FIG. 1. Laminations 62 form at least in part a linear moving element, or axial member of an alternator. A plurality of threaded fasteners 64 are received through radially spaced apart through holes in each lamination 62, restraining the laminations 62 together. The lamination assembly is then retained on shaft 34 by a washer 66 and threaded nut 72 engaged with threads 70 at one end, and a washer 69 and threaded nut 71 at an opposite end. By threading nuts 71 and 72 onto shaft 34, with spacer collar 68 inserted between assembly 38 and laminations 62, the laminations 62 and assembly 38 are axially secured onto shaft 34. Relative motion between moving laminations 62 and stationary laminations 40 produces electrical power that is output through a power feed through port and plug 74 via wires 76.

To facilitate assembly of the alternator, mounting ring 56 is used to support shaft 34 by means of flexure bearing assembly 36, opposite from piston 28. A plurality of circumferentially spaced-apart threaded fasteners 78 are used to retain ring 56 to housing 44. In this manner, flexural bearing assembly 36 mounts directly to the stack of laminations 40, or stator of the power module 12. Therefore, fasteners 78 retain both ends of the alternator in cantilever fashion to housing 44. In this manner, module body 44 can be constructed from a smaller piece of material, since it is only necessary to provide support for the internal workings of power module 12 in the region adjacent flexural bearing assembly 38. Hence, elongated end cap 48 will substantially encompass the bulk of power module 12, functioning principally as a pressure vessel, while module body 44 supports and carries the internal components independently of the end cap 48. A suitable construction for end cap 48 allows its construction with reduced cost, greatly contributing to a reduced necessity for machining and a great reduction in component cost when building power module 12.

Referring to FIG. 1, a stuffer assembly 80 is securely fitted within heater head 20 to direct the flow of working gas between hot space 24 and cold space 26, through heat exchanger 82. Movement of displacer 22 reciprocating within engine module 14 causes the flow of working gas there between. Additionally, the stuffer bore 23 is formed by assembly 80 inside of which displacer 22 reciprocates to form the clearance seal 25 there between. A plurality of thermal radiation shields 86 are provided within displacer 22 in order to improve the capture of radiant heat energy within hot space 24 being applied by burner 18. A regenerator 88, carried by stuffer assembly 80, provides heat storage for fluid flowing in one direction and heat recovery for fluid flowing in the opposite direction. A threaded ring 89 is received on stuffer assembly 80, trapping regenerator 88 on assembly 80. Ring 89 is used to mount assembly 80 within engine module 14. Ring 89 is affixed to assembly 80 by applying a thin layer of epoxy adhesive to a recessed portion along an inner diameter of ring 89, then assembling the ring to the assembly. Details of such a heater head 20, stuffer assembly 80, and displacer 22 are similar to those disclosed in our U.S. patent application Ser. No. 08/637,923 and entitled "Assemblies for Thermal Regenerative Machines", listing inventors as Laurence B. Penswick and Ray Erbeznik, and previously incorporated by reference.

According to FIG. 1, a mounting post 90 is integrally formed from piston 28. Post 90 forms a reduced diameter portion of the piston onto which flexure bearing assemblies 30 and 32 are mounted in spaced apart relation via a spacer 92, washer 94, and retaining nut 96. A plurality of fasteners 98 retain the outer periphery of assemblies 30 and 32 in spaced apart relation via a cylindrical spacer 100 to displacer 22, supporting displacer 22 onto piston 28.

Displacer assembly 22 of FIG. 1 is formed from a multiple piece construction to facilitate assembly within bore 23 and on post 90. Assembly 22 includes cap 102 formed from heat resistant alloy, and a displacer tube 104. Cap 102 is attached to tube 104 with a brazed joint. Tube 104 and cap 102 are then mounted via threads 106 to a tubular chassis 108. Tubular chassis 108 forms a tubular shaped clearance seal member, sized relative to post 90 to form a clearance seal 114 there between. The multiple piece construction of displacer 22 facilitates its assembly to post 90 and allows for periodic inspection and maintenance.

Figure 2:
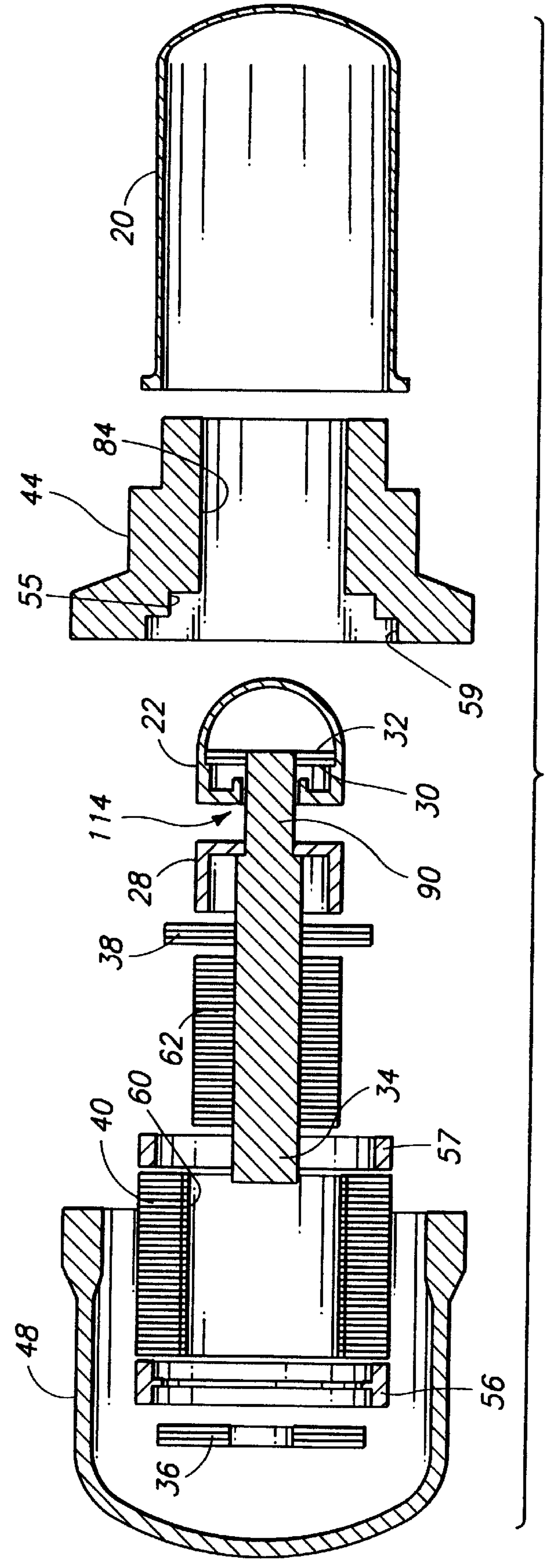
FIG. 2 is a simplified schematic exploded view illustrating the flexural bearing support assembly features of FIG. 1.

FIG. 2 illustrates schematically in center line sectional and exploded view the simplified and low cost assembly of power generator 10 provided by the flexure bearing assembly improvements detailed herein. Two significant improvements are provided by this construction: namely, mounting of outer flexure assembly 36 on lamination 40 via mounting ring 56 enables one to reduce the size of module body 44 and eliminate the need to machine threaded holes and bores in the bottom of a deep cavity within an otherwise long housing body, and form the end cap 48 in an elongated geometry configured to function principally as a pressure vessel; and springing displacer 22 on piston 28 makes more efficient use of the Stirling cycle working space within the compression space, reducing dead volume, and simplifies the manufacture of the clearance seals, and reduces the amplitude of displacement that the flexures are subjected to in operation. Hence, the arrangement can be formed with reduced size, weight, and cost of the pressure vessel that encloses the cold end of the device. Similarly, such construction can form a drive motor.

According to the first improvement, outer flexure assembly 36 is mounted directly onto outer mounting ring 56, and ring 56 is mounted directly onto the stack of laminations 40, which in turn are mounted to inner mounting ring 57 and module body 44, respectively. In this manner, the linear motor/alternator stator lamination stack 44 also functions as a structural element that provides for flexure alignment and support within device 10. Such construction enables a significant reduction in the size of module body 44, and an increase in the size of end cap 48 since body 44 is only required to support the internal components of device 10 at a single end of the stack of laminations 40 via the circumferential receiving shoulder 59 formed therein. Therefore, the length of module body 44 can be greatly reduced, eliminating a significant amount of forming and machining which was previously required to form a much larger version of module body 44. For example, it is no longer necessary to machine a deep bore or threaded holes in the bottom the deep bore. Similarly, end cap 48 is formed from a deep draw or a roll forming operation to provide a pressure vessel-type construction which can be produced more economically than one formed from cast/machined component. Therefore, a reduction in the length of module body 44 and an increase in the length of elongate end cap 48 produces a housing there between of significantly reduced cost and complexity.

In contrast, previous constructions as depicted in applicant's co-pending U.S. patent application Ser. No. 08/637,923, filed on May 1, 1996 and previously incorporated by reference, utilize an elongated version of module body 44 which forms a housing that supports the lamination stack 40 and flexure assemblies 36 and 38 along each end. With such a construction, end cap 48 simply functions as an access panel at the end of the housing.

The second improvement resulting from the low cost assembly technique depicted schematically in FIG. 2 results from the fact that displacer 22 is carried by piston 28 via mounting post 90 and flexure bearing assemblies 30 and 32. More particularly, an additional feature is disclosed in FIG. 2 in that displacer 22 and power piston 28 are sized with the same diameter which allows for use of a single common cylinder bore 84 within power module body 44. Such comprises a further optional improvement suitable for the embodiment of FIG. 1. Hence, only a single common bore need be produced, which eliminates a significant amount of machining, and eliminates any need to produce a plurality of concentric aligned bores, such as bores 23 and 42 (of FIG. 1).

As shown in FIG. 2, a single prime moving component is carried within generator 10, by mounting it to a single module body 44, after which elongated end cap 48 is mounted and sealed at a first end, and heater head 20 is mounted and sealed at a second end. The remaining stationary housing is formed by rigidly mounting together mounting rings 56 and 57 along with the stationary iron lamination 40, including magnets 60.

The single prime moving component of FIG. 2 is formed from alternator shaft 34, moving iron lamination 62, flexure bearing assemblies 36 and 38, power piston 28, mounting post 90, flexure assemblies 30 and 32, and displacer 22. The entire assembly is supported within the above-listed stationary components by flexure assemblies 36 and 38. Furthermore, displacer 22 is resiliently supported on mounting post 90 via flexure bearing assemblies 30 and 32, according to a construction which will be discussed in further detail below.

In order to ensure a proper clearance seal, the radial outer surface of mounting post 90 and power piston 28 are machined simultaneously after joining them together by welds, or fasteners, in order to improve accuracy and reduce cost. These surfaces are relied on to realize clearance seals between the outer surface of power piston 28 and bore 84, as well as between the outer surface of mounting post 90 and an opening within displacer 22 which forms clearance seal 114. Hence, the accuracy in dimensioning these surfaces is important to realizing a desired clearance seal therealong. Similarly, the surface dimensions of mounting rings 56 and 57 as well as the outer dimensions and end dimensions of stationary laminations 40 must be properly dimensioned in order to realize the accurate axial support of alternator shaft 34 within device 10 when assembled.

Similarly, power module body 44 must support the stationary (or stator) portion of the alternator. Hence, all machining operations on the module body 44 can be done in one setup, minimizing costs while maintaining a high level of accuracy between cylinder bore 84 via groove 55 and the stator support provided by groove 59.

It is envisioned that the device depicted in FIGS. 1 and 2 can be supplied with power such that laminations 40 and 62, along with magnets 60 cooperate together to form a linear motor. In such a construction, heater head 20 would form a cooler head.

According to the construction of FIGS. 1 and 2, it is also desirable to design in features that eliminate or mitigate wear between reciprocating components that can result from unplanned contacts between piston and cylinder components of device 10. Although the piston and cylinder constructions of device 10 are designed to avoid any rubbing contact, and, in fact, are designed to provide clearance seals there between, abnormal operating conditions can result in contacts there between. For example, abnormal conditions can result from externally imposed shock or vibration loads, which can be expected during use under certain extreme conditions. For normal operating conditions where no rubbing contact occurs between piston and cylinder combinations, no wear or particle generation results during normal operation. However, under such abnormal operating conditions the normally maintained clearance seal between precision pistons supported by flexure bearings and associated cylinders in which the pistons ride will produce abnormal contacts. Since the clearance gap of a clearance seal must be small in size in order to minimize the dynamic cyclic flow losses between gas spaces on either side of a piston, such clearance gaps very little room is available to accommodate out of position lateral movement. Therefore, typical shock and vibration loads can be realistically expected to produce intermittent contacts during periods of rugged use. Such is the case, even though the flexure radial stiffness of the flat spiral springs is selected such that no contact occurs between the piston and cylinder during normal use, which may include orientation in various positions that change the direction of the gravity load on the device. In order to eliminate or mitigate wear from unplanned contacts, an attempt is made to ensure that different materials and/or hardness conditions are employed between the associated pistons and cylinders forming clearance seals on the device 10 of FIGS. 1 and 2.

One approach for mitigating wear or particle generation utilizes the implementation of a low friction wear resistant coating such as a Xylan™ coating, manufactured by Whitford Corporation, West Chester, Pa. With this exemplary approach, a spray coating of Xylan™ is applied to a piston (such as piston 28 or displacer 22 of FIG. 1) which has been processed to receive the coating. Typical process steps include grit blasting, cleaning, applying Xylan™ coating, partially curing, recoating with Xylan™, and finally curing the resulting product. A final machining operation is then performed on the coated piston in order to finish-size the Xylan™ coated piston. Alternatively, such a processing operation can be performed on a cylinder in which the piston is to be received, after which a final bore diameter is sized therein by a finishing bore operation through the coated cylinder.

Another approach is to hard anodize either the piston or the cylinder, such that one of the two components has a hardness greater than the other. For example, piston 28 can be hard anodized to produce a different hardness condition along the piston than the bore 42. In the event that a contact occurs there between, any wear will occur along bore 42, preventing any damage to the outer surface of piston 28.

According to the Xylan™ coating and anodizing approaches described above, such an implementation can be utilized to protect from wear or particle generation along clearance seal 46 (see FIG. 1), of clearance seal 114 (see FIG. 2), or of clearance seal 25 provided between displacer 22 and stuffer bore 23 (see FIG. 1).

Figure 3:
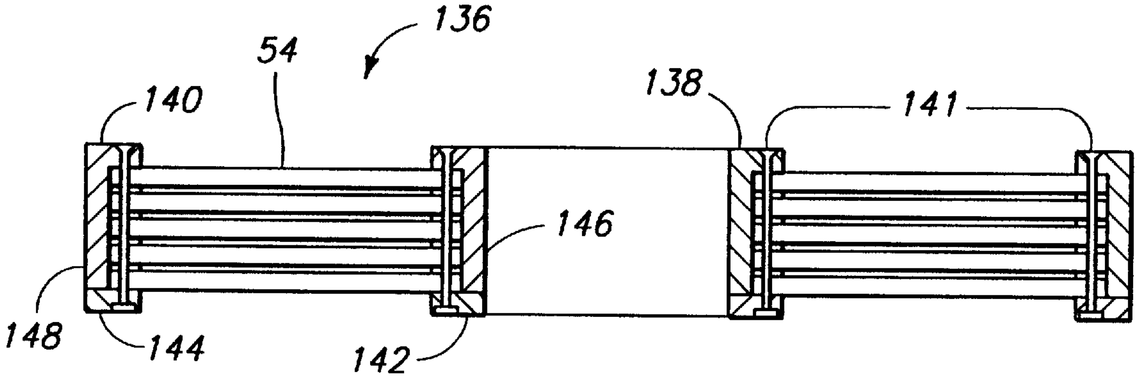
FIG. 3 is a simplified schematic center line sectional view of the rear-most flexural bearing assembly for the linear alternator of FIGS. 1 and 2.
Figure 4:
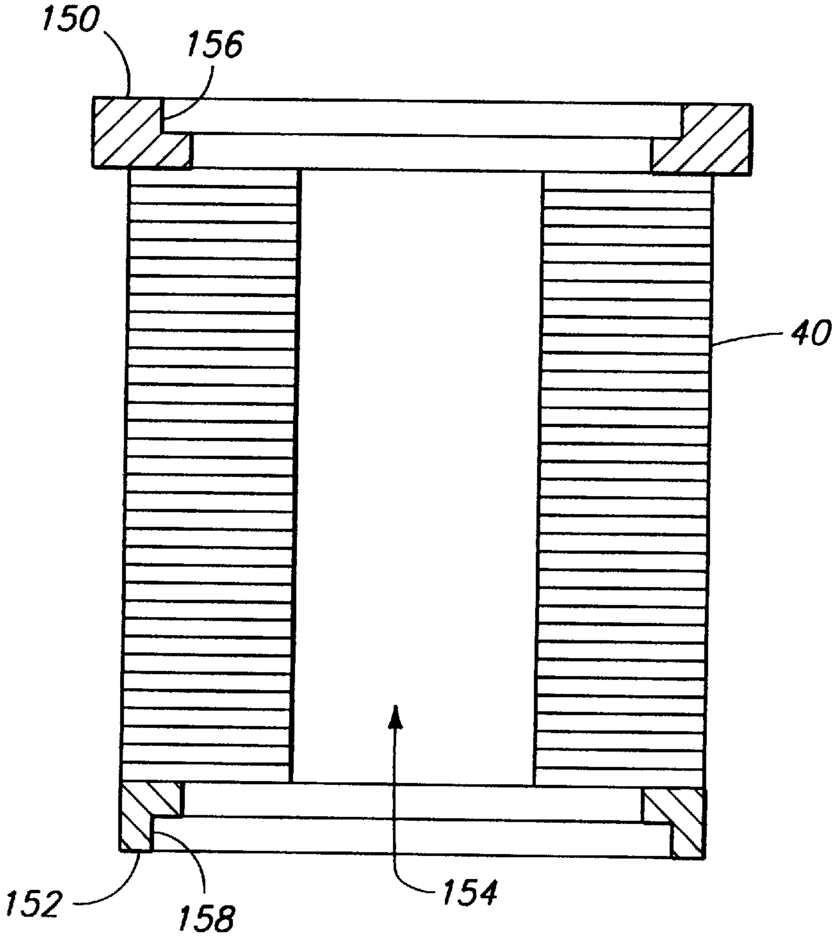
FIG. 4 is a simplified schematic center line sectional view of a linear motor/linear alternator stator configuration suitable for use with the flexural bearing assembly of FIG. 3.

According to FIGS. 3 and 4, further flexure bearing assembly improvements are depicted which can be optionally incorporated into the device of FIGS. 1 and 2. According to the construction of FIG. 3, a plurality of flat spiral springs 54 are mutually supported in a pre-fabricated stacked configuration via an inner can 138 and an outer can 140 for modular assembly within a device similar to device 10 of FIGS. 1 and 2. By mounting springs 54 in nested and stacked arrangement within the inner and outer cans, a post-assembly machining operation can be performed in order to realize accurate dimensions along inner shaft bore 146 and outer stator ring diameter 148. Hence, bore 146 can be provided in accurate coaxial relation with outer diameter 148 as it seats within the mounting device. Then, according to FIG. 3, inner can 138 and outer can 140 have an integrally formed shoulder at one end, and an open mouth at the opposite end such that springs 54 are received about inner can 138 and within outer can 140, after which an inner and an outer cylinder cap 142 and 144 are fixed to each, respectively. Can 140 and cap 144, as well as can 138 and cap 142 each form a retaining member for retaining the outer and inner peripheries, respectively, of the stack of springs 54. Preferably, each flexure has a plurality of holes along its inner and outer edge through which a plurality of fasteners 141 are received for retaining each cap to each associated can, as well as to retain the flexures in rotatably fixed relation there between. One suitable fastener construction is provided by a nut and bolt assembly. Other suitable fastener constructions are provided by rivets. In summary, the outer diameter 148 and the central bore 146 are accurately machined in one operation, resulting in a high degree of concentricity there between.

According to FIG. 4, an inner stator ring 150 and an outer stator ring 152 are affixed to either end of the stack of stationary laminations 40. In one construction, each ring is welded to one end of the stack of laminations. Subsequently, the machines are accurately machined relative to the bore 154 of the stator during a single operation. The inner stator ring interfaces in assembly with a stator support that is machined into a cylinder body of the device in which it is being used. For example, if such a construction is implemented on the device of FIGS. 1 and 2, inner stator ring 150 would interface with a circumferential receiving groove similar to groove 59 of FIGS. 1 and 2. Accordingly, a circumferential receiving groove 156 formed on inner stator ring 150 would concurrently nest in engagement with flexure bearing assembly 136 (of FIG. 3) (which would be substituted for the flexure bearing assembly 38 of FIGS. 1 and 2). Accordingly, with this construction flexure bearing assembly 136 (of FIG. 3) would be nested between a module body, or housing and inner stator ring 150, via circumferential groove 156.

Similarly, outer stator ring 152 contains a circumferential receiving groove 158 into which flexure assembly 136 (of FIG. 3) is received via outer diameter 148. Preferably, the outer flexure bearing assembly, provided by a construction similar to flexure assembly 136 (of FIG. 3), is retained in outer stator ring 152 via a plurality of threaded fasteners. Alternatively, a clamp can be used to retain flexure assembly 136 within groove 158 therealong.

According to the construction of FIGS. 3 and 4, bore 146 is provided in accurate concentric relation to stator bore 154 along the stack of laminations 40 by enabling accurate machining of bore 146 and outer diameter 148, and accurate machining of mating surfaces on rings 150 and 152, as well as grooves 156 and 158. By assembling the flexure assembly 136, then subsequently machining surfaces 146 and 148, and pre-assembling the device of FIG. 4, after which, rings 150 and 152, including bores 156 and 158, are machined, an accurate assembly can be provided there between in a device similar to that depicted in FIGS. 1 and 2.

According to one suitable assembly process, the components of FIGS. 3 and 4 can be incorporated into a device similar to that of FIG. 1 and 2 by implementing the following steps:

A. Attach the inner flexure assembly to a moving component, such as the moving component of FIG. 2 provided by numbered elements 34, 62, 28, 90, 30, 32 and 22. It is possible to attach one of flexure assemblies 136 to the moving component of FIG. 2 by utilizing a shrink fit. For example, flexure assembly 136, including inner can 138, can be preheated and assembled onto shaft 34 of FIG. 2. Subsequently, inner stack 62 is mounted onto shaft 34. Similarly, piston 28, shaft 90 and displacer 22 are mounted thereto. Subsequently, alignment of the flexure stack provided by inner flexure assembly 136 is checked for alignment of its outer diameter to the outer diameter of piston 28.

B. The moving component of step A is then inserted into the stator provided by the device depicted in FIG. 4, receiving the inner flexure assembly 136 within groove 156. Subsequently, an outer flexure assembly constructed according to flexure assembly 136 of FIG. 3 is mounted to an alternator shaft similar to shaft 34 of FIG. 2. The second, or outer flexure assembly is received within groove 158 of outer stator ring 152. As was the case for the inner stator assembly, the outer stator assembly can also be shrink fitted to alternator shaft 34. Alignment of the piston outer diameter to the outer diameter of the inner stator support ring 150 is thereby ensured.

C. Flexure assemblies 30 and 32 are then assembled to displacer 22 and mounted onto mounting post 90, forming clearance seal 114 there between. A check is performed to confirm rod seal freedom, and alignment of displacer body seal outer diameter relative to piston seal provided between post 90 and displacer 22 via clearance seal 114; and D. Perform electrical checks on the resulting linear alternator (or linear motor) to confirm operation, and insert the moving component assembly into position for mounting to the housing, such as module body 44 and end cap 48 of device 10, depicted in FIG. 2.

A number of alternative assembly techniques are also possible which can take advantage of the basic mechanical arrangement of the components depicted in FIGS. 3 and 4. Such a modular construction for a flexure assembly 136 and a stator arrangement shown in FIG. 4 is suitable for a large number of Stirling-type machines, including various engine and cooler constructions.

A second benefit provided by the construction features of device 10, according to FIGS. 1 and 2 results from springing displacer 22 onto power piston 28 via mounting post 90 and flexure bearing assemblies 30 and 32. In order to best understand the benefits resulting from such a construction, a review of presently available techniques will be of benefit, according to the devices depicted in FIGS. 5 and 6, and discussed below.

Figure 5:
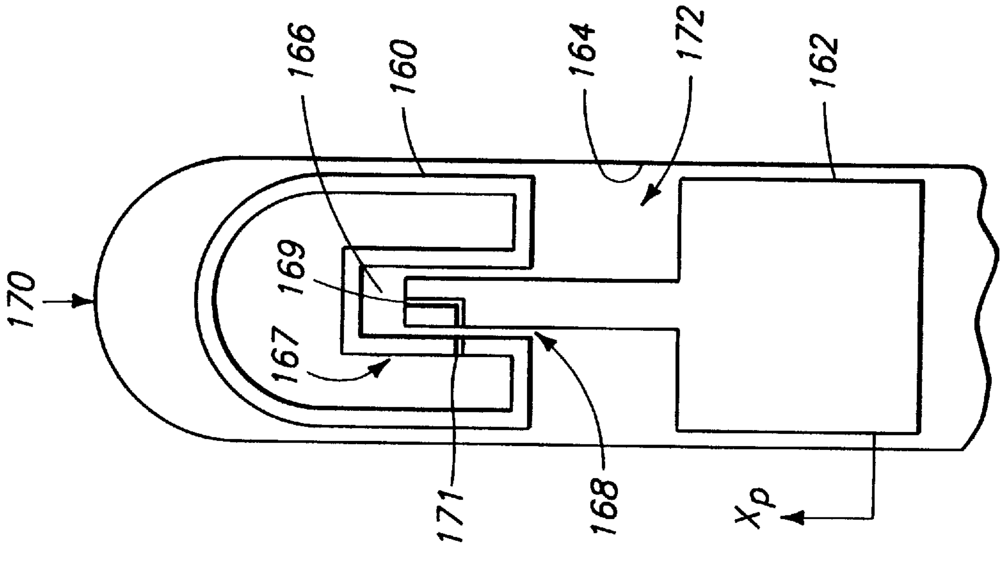
Fig. 5 PRIOR ART
FIG. 5 is a simplified schematic view illustrating a prior art displacer sprung to piston utilizing a gas spring.

FIG. 5 illustrates a prior art implementation depicting a displacer 160 that is sprung to a mechanical piston 162 within a common cylinder bore 164, by way of a gas spring 166 and a seal 168. According to this construction, piston 162 is integrally mounted to the moving portion of a linear alternator. In this manner, displacer 160 moves in reciprocation in response to heat being applied at head 170. Displacer 160 and piston 162 form distinct free pistons that move in response to pressures being applied to cold space 172 as a result of motion of displacer 160. However, a seal 168 is formed between displacer 160 and a guide shaft extending from piston 162, enabling formation of a gas spring 166 between the displacer and piston. Typically, gas spring 166 provides the necessary restorative spring force to properly resonate the displacer, and does not itself center the displacer. Therefore, something is still needed to ensure that displacer 160 does not bottom out in contact with piston 162, during normal operation. Such a result can occur where there is only a gas spring, since displacer 160 can wander off-center from its intended centered operating position during normal operation.

In order to prevent wandering off-center, a spool valve 167 is added to displacer 160 and piston 162 to provide center porting of the displacer 160 relative to the piston 162. A gas spring centering port 169 is provided in the guide stem of piston 162, and a gas spring centering port 171 is provided in displacer 160 for communicating with port 169 when positioned therealong. When ports 169 and 171 align, gas spring 166 is vented to the interior of displacer 160 which does not experience the cyclic pressure variations of spring 166. Hence, spring 166 is periodically vented to the interior of displacer 160 (which is at a mean cycle pressure) via spool valve 167. The valve 167 is open only when displacer 160 crosses a nominal center position relative to piston rod. In this manner, valve 167 and gas spring 166 ensure retention of displacer 160 within that centered region of operation, preventing inadvertent drift that results in contact or bottoming out with piston 162 or head 170.

Figure 6:
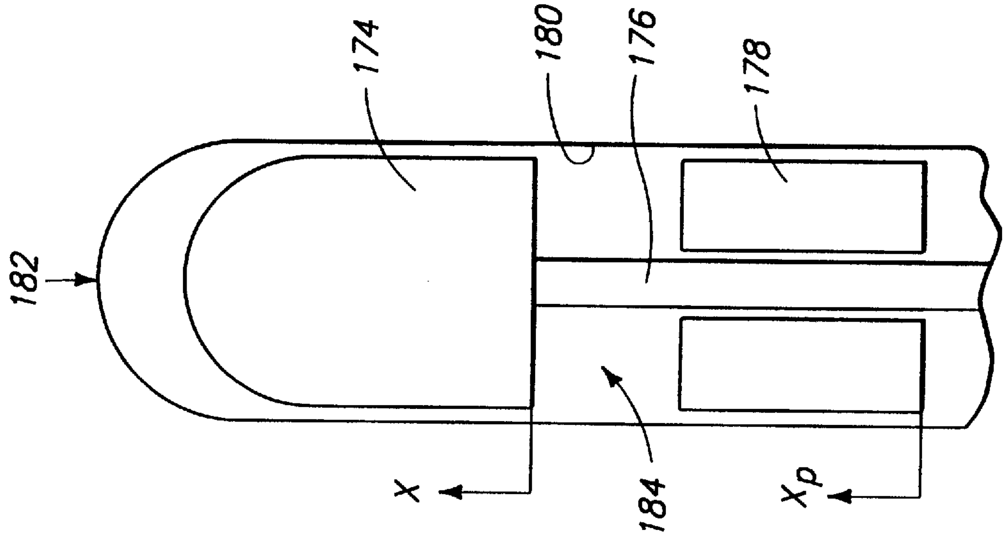
Fig. 6 PRIOR ART
FIG. 6 is a simplified schematic view illustrating a prior art conventional displacer sprung to ground, and decoupled from a piston.

FIG. 6 depicts a prior art construction of a conventional displacer 174 sprung to ground via a shaft 176 and a spring arrangement (not shown—but typically a plurality of flexure bearing assemblies). A working piston 178 is coupled with the moving laminations of an alternator, and forms a separate free piston from that formed by displacer 174. With this construction, displacer 174 is physically connected to the device forming bore 180, and provides the housing structure of the device. In this manner, application of heat at head 182 produces reciprocation of displacer 174 within the limits of the spring structure mounting the displacer in the device. As a result of motion of displacer 174, working fluid is transferred into and out of cold space 184, causing concomitant motion of piston 178 and an associated moving inner lamination of a linear alternator, affixed thereto.

Figure 7:
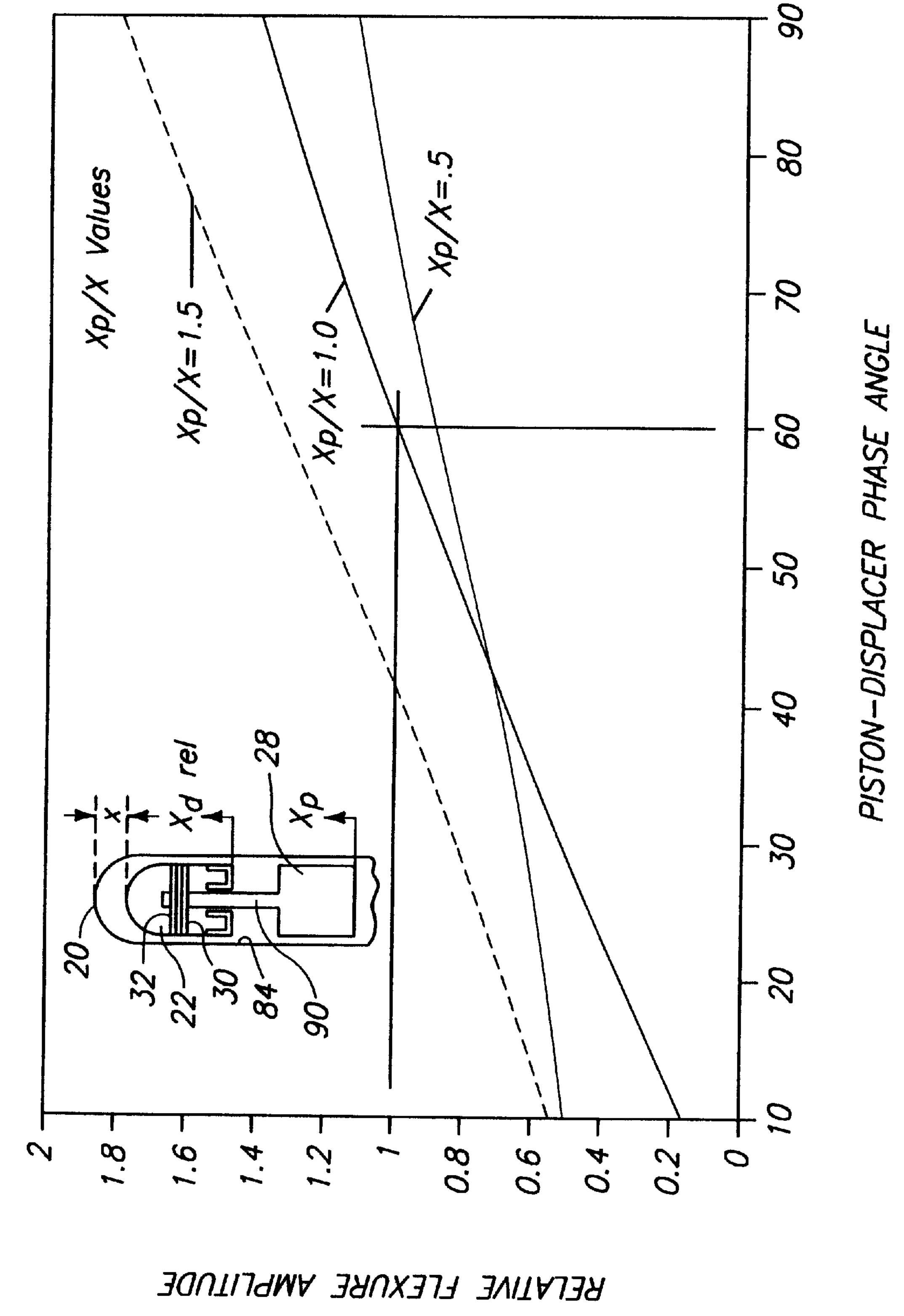
FIG. 7 illustrates actual displacer flexural amplitude relative to displacer amplitude "seen" by the compression and expansion spaces for various piston amplitudes and phase angles according to the displacer sprung to piston construction utilizing a flexure of FIGS. 1 and 2.

According to FIG. 7, the device of FIGS. 1 and 2 is shown in simplified schematic form wherein displacer 22 is mounted to piston 28 via flexure bearing assemblies 30 and 32 and mounting post 90. Displacer 22 and piston 28 reciprocate within a common bore 84. Such a construction has at least two potential advantages over the more conventional displacer sprung-to-ground arrangement of FIG. 6:

A) A more effective use is made of the Stirling Cycle compression space, thereby reducing dead volume.

B) Manufacture of the cylinders and seals is simplified due to the reduction in required machining tolerances and/or the number of concentric surfaces.

The use of flexure bearing assemblies 30 and 32 in FIG. 7 to replace the gas spring 166 and spool valve 167 of FIG. 5 will result in the benefits provided by FIG. 5, while eliminating the disadvantages. Centering of displacer 2 within head 20 is caused by the springs of assembly 32, instead of by gap porting of a gas spring as has been done in the past. One disadvantage of the FIG. 5 implementation, which is overcome by the FIG. 7 implementation, is the problem in properly sizing the displacer 160 in relation to the gas spring 166 (of FIG. 5). According to the FIG. 7 construction, the gas spring is replaced by mechanical flexure springs, thus eliminating the problem of sizing the gas spring. Additionally, it is possible to derive an additional advantage when using flexure bearing assemblies 30 and 32. Namely, by operating the resulting device under certain operating conditions, the absolute amplitude of the displacer flexures of assemblies 30 and 32 can be significantly less than the relative absolute motion of displacer 22 in relation to the volumes within the expansion and compression spaces of the device. By operating displacer 22 in synchronization with piston 28, with a lag or lead of less than 90° phase shift, such an enhanced displacement of displacer 22 can be realized, while minimizing the absolute amplitude displacement of flexure bearing assemblies 30 and 32, which proves to be a major factor in determining the stress state of the flexure, as well as the fatigue life there along.

FIG. 7 illustrates a plot of actual displacer flexure amplitude for the flexures of assemblies 30 and 32 (of FIGS. 1 and 2) relative to the displacer amplitude "seen" by the compression and expansion spaces for various piston amplitudes and phase angles. For example, if one wants to sweep X amplitude of expansion/compression space with the displacer and the piston is moving X amplitude ($X_P/X=1.0$) at all phase angles greater than 60°, the displacer flexure will have an absolute amplitude greater than X. However, below 60° in phase angle, the flexure amplitude falls below X. In the limit, at a 0° phase angle, the displacer flexure amplitude is at 0. Essentially, no Stirling Cycle operation can be realized under this operating condition. Two other ratios of $X_P/X$ are also shown in FIG. 7.

The resulting effect, plotted in FIG. 7, can be exploited to expand the applicability of current flexures (according to the above mentioned design constraints on amplitude/frequency/stress) if the Stirling Cycle can be configured to operate effectively at the "lower" piston-displacer phase angles. Hence, a flexure supported displacer 22, carried on assemblies 30 and 32, can be constructed to operate under conditions of amplitude, stress, and frequency that would not be possible if the displacer were sprung solely to ground, according to the construction of FIG. 6. Furthermore, the benefits of having completely free piston operation between the displacer and power piston, according to the construction of FIG. 5, can also be received, without having the problem of the displacer drifting from its intended centered position (which is a concern when utilizing the implementation of FIG. 5).

Figure 8:
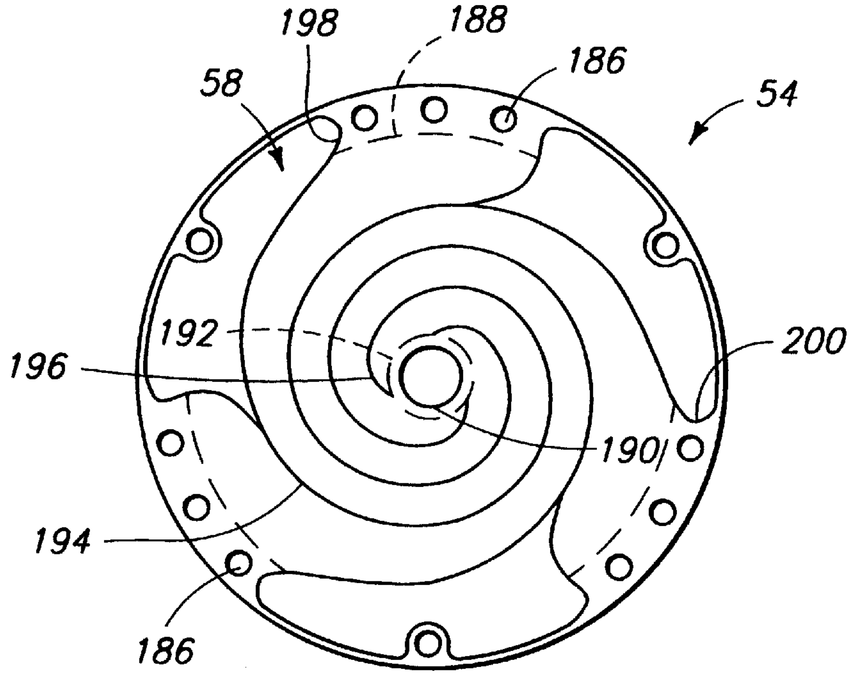
FIG. 8 is a plan view illustrating a reduced weight flexural spring used in the device of FIGS. 1 and 2.
Figure 9:
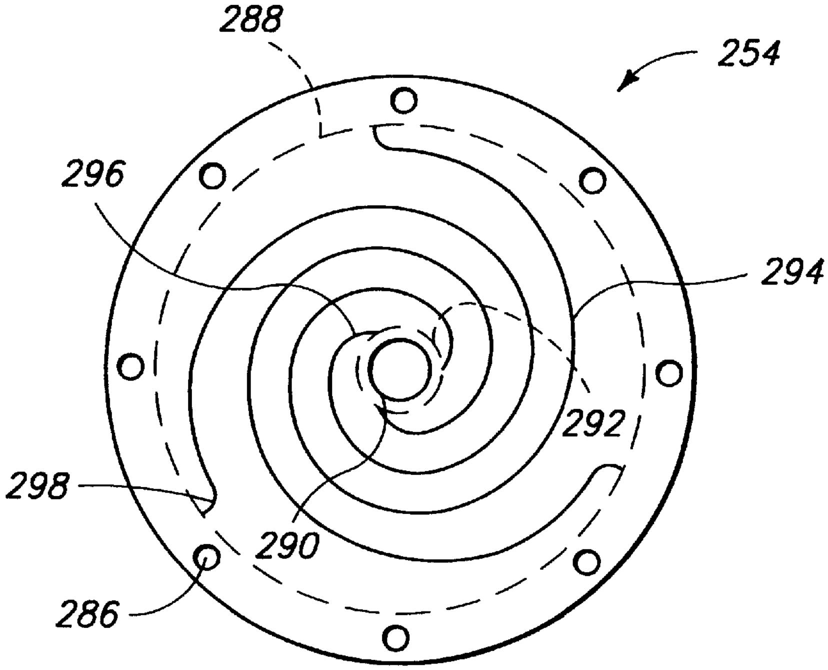
FIG. 9 is a plan view illustrating an alternatively constructed flexural spring for use in the device of FIGS. 1 and 2.

Another flexure bearing improvement which can be implemented on the devices of FIGS. 1 and 2 is the improved construction for flat spiral spring 54, as shown in FIG. 8. The improvement consists of a plurality of apertures 58 that are formed within the spring for purposes of reducing the flexure mass and providing access holes through the flexure. An alternatively constructed flat spiral spring 254 (see FIG. 9) was disclosed in the parent U.S. patent application Ser. No. 08/105,156, filed on Jul. 30, 1993, entitled "Improved Flexural Bearing Support, with Particular Application to Stirling Machines", listing the inventor as Carl D. Beckett et al., and already incorporated by reference: However, the low mass improvement features of FIG. 8 are more suited to the device depicted in FIGS. 1 and 2. Optionally, the flat spiral spring 254 of FIG. 9 can be substituted for spring 54 in the device 10 of FIGS. 1 and 2.

FIG. 8 is a plan view of an improved planar flexure, or flat spiral spring 54. As illustrated, flexure 54 consists of a circular disk of flat sheet metal with attachment holes 186 distributed near its outer periphery. Clamping of individual flexures 54 within a stack (such as flexure bearing assembly 36 of FIG. 1 or flexure bearing assembly 136 of FIG. 3) is achieved by mounting bolts (not shown) which pass through holes 186 in associated rigid annular clamping rings to secure the flexure between the inner clamping diameter 188 and the outside edge or periphery of a flexure. Additionally, thin washer shaped spacers (not shown), which are typically deployed between adjacent flexures and the stack, fill the gap between the inner clamping diameter 188 and the flexure outer diameter edge. Alignment holes are provided in the spacers for receiving the mounting bolts.

As used herein, the terms "flexure" and "flat spiral spring" are used interchangeably to describe springs formed from a flat sheet of metal having spiral curves cut through it. A flexure can comprise a single flat spiral spring or a stacked plurality of closely adjacent springs separated by spacer washers that are clamped between the moving members and work in unison. The preferred flexure material for most applications is Sandvik 7C27Mo2 valve Steel (Stainless), available through Sandvik Steel Company, Strip Products Division, Benton Harbor, Mich. The high strength and fatigue resistent nature of this material contribute to reducing the size and weight of the flexure assembly, in comparison with most other readily available candidate materials.

According to this construction, flexure 54 is clamped at its center between a central mounting hole 190 and clamping diameter 192. If spacers are used in the outer regions, others of the same thickness with an outside diameter equivalent to the diameter 192 and an inside diameter equivalent to the diameter of hole 190 are used in the inner clamping region.

Spiral cut kerf 194 extending between outer diameter 188 and inner diameter 192 form the arm(s) of the flexure 54. Three arms are illustrated in FIG. 8, but versions with one, two and three arms have been successfully implemented in practice. Selecting the best shape for the flexure arms is a compromise between conflicting objectives. Objectives are a high axial displacement capability, high surging natural frequency, and a high radial stiffness, while maintaining stresses well below the endurance limit to provide essentially infinite flex life. The arm design can be optimized using a finite element analysis (FEA) code to maintain stresses as nearly uniform as possible throughout the arm(s) during extension. The desired axial stiffness and radial stiffness can be obtained by selecting the thickness of the individual flexures and the total number of flexures in a flexure assembly stack to achieve the desired set of characteristics. Material selection is also a very important parameter which can significantly impact the functionality of the design.

Apertures 58 are then cut along the radial outer edge of each kerf 194, opening up the kerf to form the aperture 58 there along. As shown in FIG. 8, aperture 58 extends from a position along kerf 194 between diameter 192 and diameter 188, and the inner radial edge of aperture 58 follows the general contour of kerf 194, until it passes diameter 188. Optionally, aperture 58 can extend completely through the outer diameter of spring 54, such that a circumferentially discontinuous outer edge is provided on the spring. However, to facilitate mounting an assembly via holes 186, it is preferred to leave a thin, or nominal outer diameter edge portion along each aperture 58. Furthermore, such nominal edge portion provides for material around associated mounting holes 186.

Preferably, apertures 58 have a radial inner edge surface that follows the contour, or defining line of kerf 194, and a removed portion that extends from the general path of kerf 194, in a radially outward direction.

The process used for cutting kerf 194 as well as aperture 58 is likewise very important. If the process leaves microscopic damage adjacent to kerf 194, or the radial inner edge of aperture 58, localized stress risers can lead to premature failure. The preferred methods identified to date are chemical milling and abrasive water jet cutting. Kerf 194 and aperture 58 treatment is particularly important along each end 196 and 198, respectively, where it is important to avoid stress risers. One technique successfully demonstrated for avoiding stress risers at end 196 is to form a turn out of kerf end 196. One technique successfully demonstrated at end 198 is to form a terminating radius 200 where the generating line of kerf line 194 terminates on the outer boundary of aperture 58, where it forms the radial outermost portion of the aperture, before stopping short of progressing beyond the outer diameter of spring 54. Hence, radius 200 provides a relief transition by widening the kerf in the region of the aperture 58, while allowing for minimization of weight in the construction of spring 54. According to stress tests done to date, removal of material from the region of aperture 58 does little to reduce the fatigue life of spring 54.

Accordingly, the spring 54 of FIG. 8 provides a low mass flexure that has applications for use where reduced weight is required. Additionally, a gas flow path is provided through the flexure, via aperture 58. Even furthermore, a path is provided through which electrical wiring can be passed in a device, such as is shown in device 10 (of FIG. 1).

By removing material from the region of aperture 58, the mass of flexure of 54 will reduce the mass of the overall machine in which it is mounted. Hence, if a low weight machine is required (e.g., for space application), the reduction in mass from material removal in region 58 proves beneficial. Additionally, when flexure 54 is being used as the spring for a spring mass system that has to resonate at a "high" frequency (such as flexures 54 of FIG. 1), the mass of each flexure spring 54 adds to the overall mass of the moving spring/mass system. Thus, the more the moving spring weighs, the higher a spring constant is required for the system. Hence, a higher spring constant is required for a higher mass. By eliminating some of the mass through removal of material in aperture 58, fewer springs are required for a given spring/mass system. The foregoing occurs because part of the spring is being used to spring the flexure mass and part is being used to spring the moving component. Hence, the material removed from aperture 58 would be carried by the spring 54 if it were present, while contributing little or nothing to the spring constant of spring 54. Hence, reducing the mass of spring 54 reduces the overall moving system mass, which further reduces the need for additional spring constant, reducing the total number of flexure springs 54 required in a flexure assembly, such as assemblies 31 and 32 of FIG. 1.

According to the optional construction of FIG. 9, it may be required to cut a groove (notch) around the base of the flexure, where the flexure attaches to the housing, in order to provide for gas flow therethrough. Hence, aperture 58 cut out in spring 54 of FIG. 8 eliminates the need for making a cut out in the housing in which the spring is mounted, saving machining time and costs when forming the housing. For example, it may be necessary to cut a gas flow path in module body 44, in order to provide for flow by of gases through flexure assembly 38 (as depicted in FIG. 1) when utilizing spring 254 of FIG. 9.

According to FIG. 9, flat spiral spring 254 has a plurality of corresponding kerfs 294, similar to that shown in spring 54 of FIG. 8. However, spiral cut kerfs 294 extend between outer diameter 288 and inner diameter 292, adjacent to central mounting hole 290. Additionally, a turn out of kerf ends 296 and 298 functions to avoid a stress riser therealong. When clamped together, along the outer adjacent region defined by outer diameter 288, a plurality of mounting holes 286 retain spring 254 within a machine, during use. Hence, the construction of FIG. 9 can be utilized within any of a number of Stirling cycle machines having flexure springs and clearance seals therein, including the device depicted in FIGS. 1 and 2. However, the further additional benefits provided in the spring 54 of FIG. 8 for reducing mass are not realized to the same degree.

Further additional benefits provided by including aperture 58 in spring 54, according to FIG. 8, results from the ability to route wires through aperture 58 when utilized within a device. For example, device 10 of FIGS. 1 and 2 shows the routing of wires through aperture 58 on flexure assembly 36, enabling the routing of wires 76 to the coils of the linear alternator provided by laminations 40 and 62. It becomes readily apparent that, for some applications, there can be a problem in finding a way to get wires from a motor or alternator past the flexures to a feed through in the pressure vessel. For cases where spring 254 of FIG. 9 is utilized on the devices of FIGS. 1 and 2, it is necessary to machine special holes or grooves in the surrounding housing in order to provide a path for wire routing. With the utilization of the low mass flexure according to the construction of FIG. 8, wires can be routed directly through the cut outs, or aperture 58 within the flexure spring 54.

In order to determine the geometry of aperture 58, finite element stress analyses have been done to define the peripheral contour of aperture 58 such that material is removed only from the low stress area. Such removed material is not required, because of the low stress, and it has little or no impact on the axial or lateral spring rate. In most cases the material would be removed from the outer surfaces of the flexure, as shown in FIG. 8. An outer circumferential ring of material is preferably retained in order to help retain the dimensional stability of the flexure, facilitating assembly and maintenance of a device containing the flexure therein. Without the outer ring, the flexure would probably go out of round and lead to some difficulty in assembling and aligning the flexure during assembly of the device and associated clearance seals there along. For cases where alignment is not an issue, the outer nominal ring portion can be eliminated in order to realize a further reduction in mass for spring 54.

Figure 10:
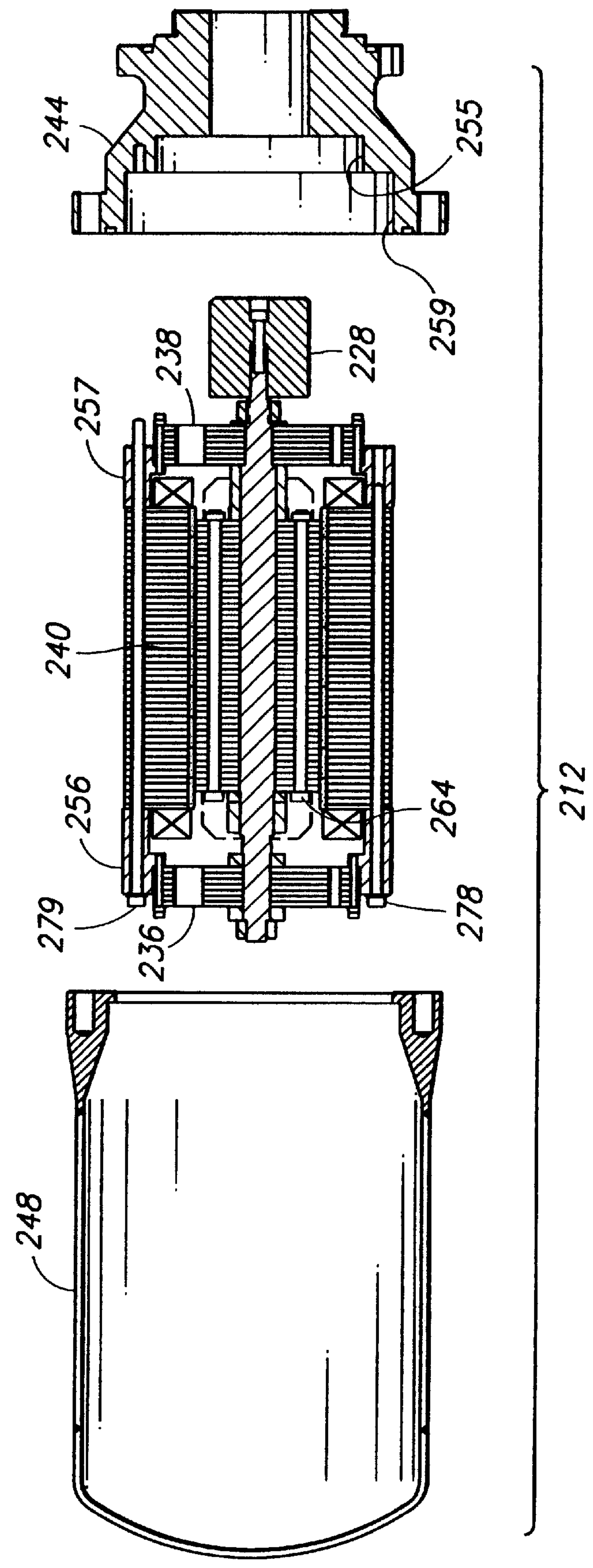
FIG. 10 is a vertical sectional view of a Stirling engine generator having alternatively constructed power module and improved flexural bearing support assembly features embodying this invention.

FIG. 10 illustrates one alternative construction for power module 12 of power generator 10, as previously disclosed in FIGS. 1–9. According to this implementation, a power module 212 is constructed with aft and forward flexure assemblies 236 and 238, respectively, mounted to stator 240 via aft and forward mounting rings 256 and 257, respectively. The resulting subassembly is then secured together with a plurality of circumferentially spaced-apart threaded fasteners that engage with threaded bores in ring 257. Additionally, alternating circumferentially spaced-apart threaded fasteners 279 extend through ring 257 to secure the assembly to housing 244 via a plurality of complementary threaded bores within housing 244. With this construction, a major subassembly (motor/alternator and piston) including assemblies 236 and 238, rings 256 and 257, stator 240, and piston 228 (along with the inner moving elements and stator shaft) can be aligned as a subassembly and then mounted to housing 244. Finally, housing 248 in the form of an elongate pressure vessel is provided for attachment to housing 244. Housing 248 is made from a welded three piece thin walled construction, greatly reducing machining costs, as well as reducing the required length of housing 244.

Housing 244 forms a cylindrical bore 255 which is sized to receive flexure assembly 238 therein. Additionally, housing 244 includes another cylindrical bore 259 which is sized to receive ring 257 therein. A plurality of the circumferentially spaced-apart threaded fasteners 279 extend completely through ring 257 and thread in engagement with corresponding threaded apertures of housing 244. Additionally, thread fasteners 264 retain together the moving iron laminations of the alternator.

Figure 11:
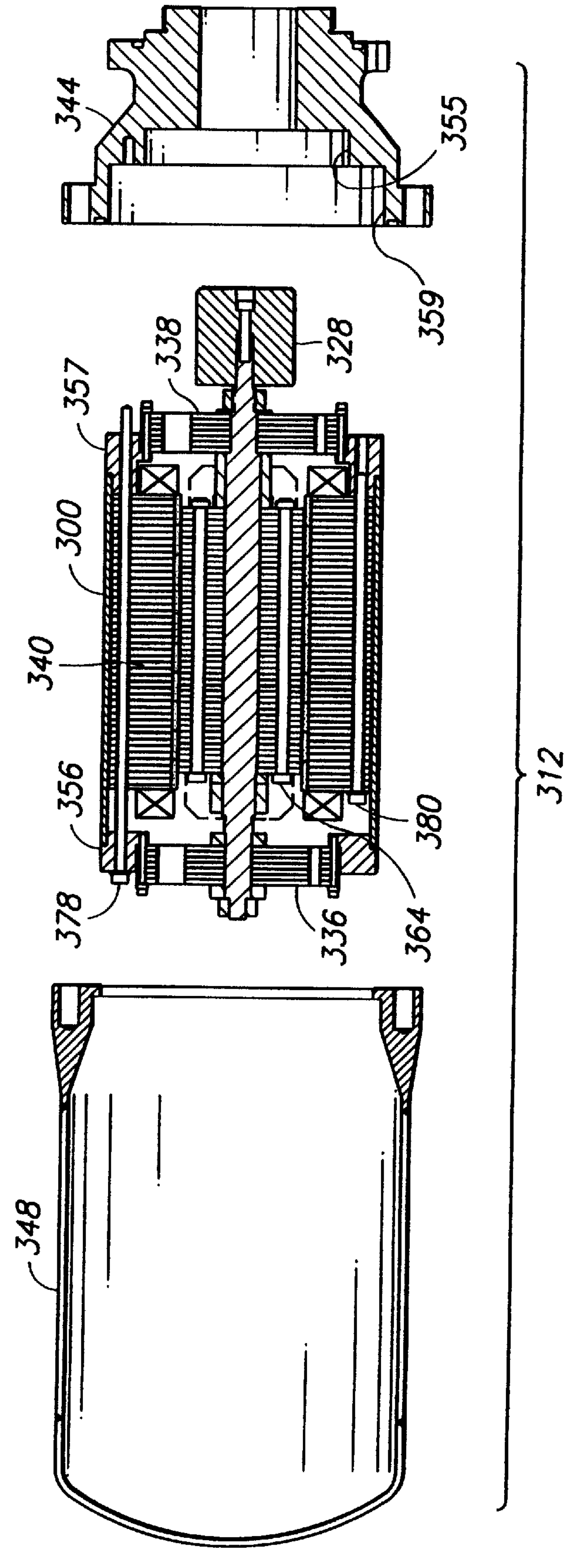
FIG. 11 is a vertical sectional view of a Stirling engine generator having another alternatively constructed power module and improved flexural bearing support assembly features embodying this invention.

According to FIG. 11, another alternative construction for a power module of a power generator is disclosed by power module 312. Power module 312 includes a subassembly similar to that depicted in FIG. 10, except for the addition of a support cylinder 300. Support cylinder 300 supports and encircles a stator 340, and mounts between an aft and a forward mounting ring 336 and 338 at each end, respectively. Cylinder 300 forms a tubular member. A plurality of circumferentially spaced apart threaded fasteners 378 retain a subassembly of the cylinder 300 and rings 356 and 357 to housing 344, similar to the fastening layout on the device of FIG. 10. Likewise, an alternating plurality of threaded fasteners 380 secure the subassembly together by engaging within complementary threaded bores in ring 357. Hence, cylinder 300 is retained in ass e mbly between rings 356 and 357, then mounted to housing 344. Stator 340 is retained to ring 357 via a plurality of the circumferentially spaced apart threaded fasteners 380. Aft and forward flexure assemblies 336 and 338, respectively, then mount to stator 340 via the aft and forward mounting rings 336 and 338, respectively. A piston 328 and associated inner moving elements and stator shaft are supported for movement within stator 340 by rings 356 and 357 at each end. Threaded fasteners 364 hold together the moving iron laminations of the alternator. Housing 348 is constructed similarly to housing 248 of FIG. 10.

The resulting subassembly of FIG. 11 is then mounted to housing 344, with ring 357 being mounted within groove 359 and assembly 338 being received in groove 355. According to this construction, aft flexure assembly 336 is mounted to ring 357 via cylinder 300 and ring 356. Cylinder 300 functions in the subassembly to pre-align the stacks or laminations that form stator 340, and to align stator 340 with rings 356 and 357 at each end. Furthermore, cylinder 300 provides a stable platform for aft flexure assembly 336 and imparts critical alignment therealong.

Figure 12:
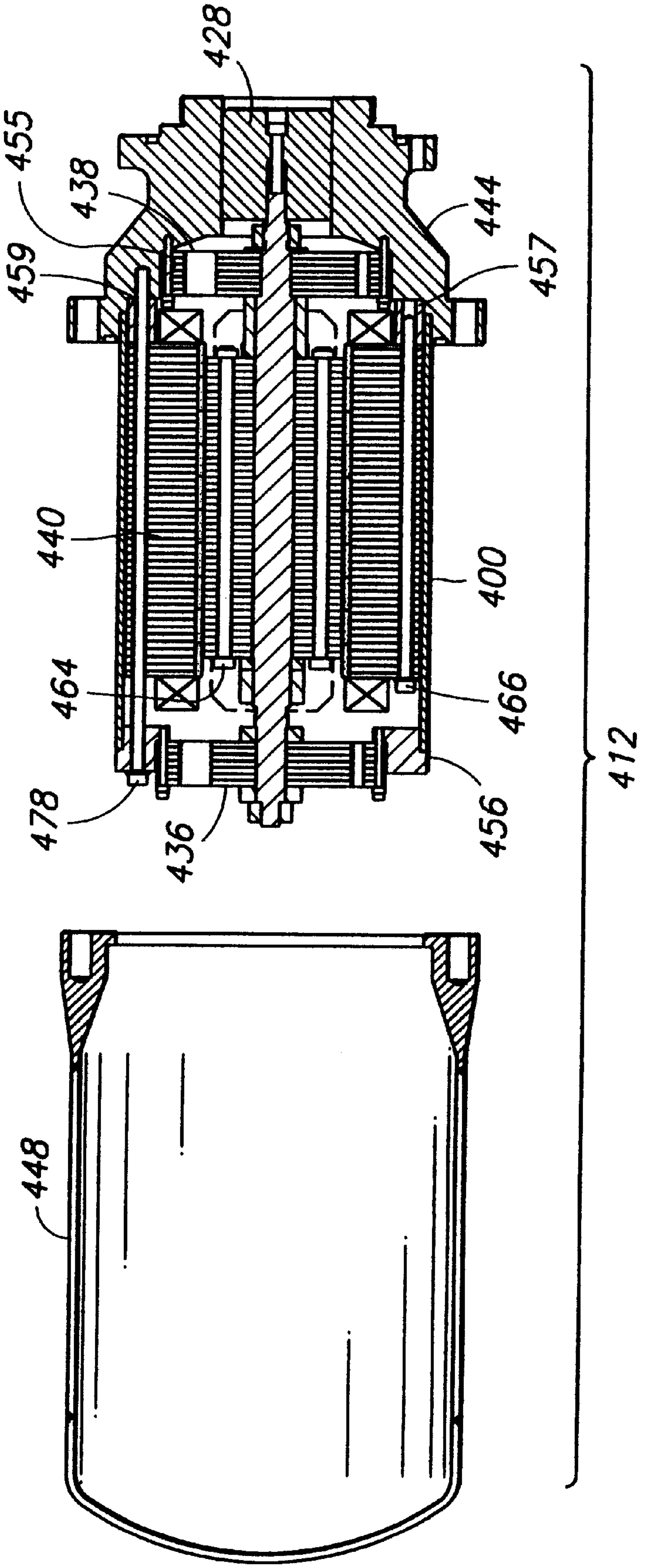
FIG. 12 is a vertical sectional view of a Stirling engine generator having yet another alternatively constructed power module and improved flexural bearing support assembly features embodying this invention.

FIG. 12 illustrates yet another alternative construction for a power module of a power generator and is generally designated with reference numeral 412. According to this construction, a forward flexure assembly 438 is mounted to a housing 444, within a circumferential receiving groove 455. A piston 428 (along with the inner moving elements and the stator shaft) is attached by way of the shaft to the forward flexure assembly 438. An aft flexure assembly is then mounted onto housing 444 via cylinder 400 and ring 456. Stator 440 is supported and carried within cylinder 440, and installed on housing 444 with a plurality of separate dedicated threaded fasteners 466. Fasteners 466 comprise a plurality of circumferentially spaced-apart threaded fasteners that engage with complementary threaded bores in ring 457. Ring 457 then seats in assembly within a cylindrical receiving bore 459, and a plurality of alternating circumferentially spaced-apart threaded fasteners 478 retain rings 456 and 457 and tube 400 to housing 444. Cylinder 440 in assembly provides a stable platform for ring 456, which in turn provides a stable support for flexure assembly 436 when combined with stator 440. Cylinder 400 also assists in stabilizing the laminations of stator 440, ensuring that relative movement does not occur between the laminations. Housing 448 is constructed similarly to housing 248 of FIG. 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A thermodynamic machine, comprising:

a housing having an internal chamber;

a laminated stator having a central bore, the stator supported at one end by the housing;

a linear moving element supported for reciprocation within the laminated stator central bore;

a piston carried by the linear moving element for reciprocation within a cylinder bore of the chamber; and at least one flexure bearing assembly including radially spaced connections for connecting in assembly to the linear moving element and the laminated stator, respectively, for supporting the linear moving element for relative axial movement from the laminated stator.

2. The machine of claim 1 wherein the laminated stator is carried along a first end by the housing, and the flexure bearing assembly connects with the linear moving element and the laminated stator along a second end of the laminated stator.

3. The machine of claim 2 wherein the at least one flexure bearing assembly comprises a first flexure bearing assembly configured to connect the linear moving element and the laminated stator along a first end of the laminated stator, and a second flexure bearing assembly configured to connect the linear moving element and the housing along a second end of the laminated stator.

4. The machine of claim 1 wherein the piston is carried within the cylinder bore so as to form a clearance seal therebetween.

5. The machine of claim 1 wherein the stator comprises a cantilever carried at one end by the housing.

6. The machine of claim 1 further comprising a support cylinder configured to encase the laminated stator.

7. The machine of claim 1 further comprising an elongated end cap carried by the housing such that the laminated stator and the axial member are supported by the body and encased within the elongated end cap.

8. The machine of claim 1 wherein the linear moving element comprises a moving portion of an alternator.

9. The machine of claim 1 wherein the linear moving element comprises a moving portion of a motor.

10. A piston and displacer assembly configured to be movably supported within a chamber in a housing of a thermal regenerative machine, comprising:

a piston constructed and arranged to communicate with a working gas in the chamber, and supported for reciprocation within a bore of the chamber;

a displacer constructed and arranged to communicate with the working gas in the chamber, and supported for reciprocation within a bore of the chamber; and at least one flexure bearing assembly including radially spaced connections for connecting in assembly to the piston and the displacer, respectively, for accommodating relative axial movement between the piston and the displacer;

the flexure bearing assembly configured to provide a spring having a spring constant sized to realize a piston-to-displacer phase angle in operation of at most 60 degrees.

11. The assembly of claim 10 further comprising at least one flexure bearing assembly including radially spaced connections for connecting in assembly to the piston and the housing, respectively, for accommodating relative axial movement of the piston within the housing chamber.

12. The assembly of claim 10 wherein the piston is supported within a piston bore so as to form a clearance seal there between.

13. The assembly of claim 10 wherein the displacer is supported within a displacer bore so as to form a clearance seal there between.

14. The assembly of claim 10 further comprising an elongate member carried by the piston at a first end, and affixed to the at least one flexure bearing assembly at a radial inner-most connection.

15. The assembly of claim 10 wherein the piston and the displacer are supported for reciprocation within a single, common bore.

16. An internally mounted flexure bearing assembly for coaxial non-rotating linear reciprocating members in power conversion machinery, comprising:

an axial member centered about a reference axis;

a tubular member having a hollow interior structure, the axial member extending at least in part within the hollow interior structure of the tubular member; a stator disposed within the hollow interior structure;

a body configured to support the tubular member along one end; and a flexure in the form of at least one flat spring positioned across the hollow interior structure of the tubular member, the flat spring including radially spaced connections for securing the flat spring to be carried by the axial member and the tubular member, respectively, for accommodating relative axial movement between the axial member and the tubular member.

17. The assembly of claim 16 wherein the stator comprises a laminated stator.

18. The assembly of claim 16 wherein the tubular member comprises a support cylinder.

19. The assembly of claim 16 wherein the axial member comprises a linear moving element.

20. The assembly of claim 16 wherein the flexure comprises at least one flat spiral spring.

21. The assembly of claim 16 wherein the body carries the tubular member along a first end of the tubular member, and the flexure is supported by the tubular member along a second end, the flexure being further configured to support the axial member there along.

22. The assembly of claim 21 further comprising another flexure supported by the tubular member along the first end, the another flexure being configured to further support the axial member.

23. The assembly of claim 21 further comprising another flexure supported by the body adjacent the first end of the tubular member, the another flexure being configured to further support the axial member.

24. The assembly of claim 16 wherein the axial member comprises a moving portion of an alternator and a piston, in operation the piston being driven in reciprocation by cyclic pressure oscillations of working gas acting against the piston.

25. The assembly of claim 16 further comprising a mounting ring interposed between the flexure and the tubular member so as to further comprise a flexure bearing assembly, the mounting ring being constructed and arranged to carry the flexure bearing assembly and the tubular member in mounted relation there between.

26. The assembly of claim 16 wherein the tubular member in use is carried in fixed relation with a housing of the machinery to which the assembly is to be mounted.

27. The assembly of claim 16 wherein the axial member comprises an elongate and axially movable element.

28. A flexure bearing assembly for power conversion machinery, comprising:

an axial member;

a laminated stator having a hollow portion, the axial member disposed for axial movement in the hollow portion;

a body configured to carry the laminated stator adjacent one end; and a flat spring flexure having radially spaced connections for securing the flat spring flexure to the axial member and the laminated stator, respectively, for accommodating relative accurate axial reciprocation of the axial member relative to the body.

29. The assembly of claim 28 further comprising a support cylinder.

30. The assembly of claim 28 wherein the laminated stator is carried within the support cylinder.

31. The assembly of claim 28 wherein the body further comprises a cylinder bore sized to receive the axial member for movement therein.

32. The assembly of claim 31 wherein the axial member comprises a piston supported for movement within the cylinder bore.

33. The assembly of claim 32 wherein the piston is received within the cylinder bore so as to form a clearance seal therebetween.

34. The assembly of claim 28 wherein the axial member further comprises a moving portion of an alternator.

35. The assembly of claim 28 wherein the axial member comprises any elongate and axially movable element.

36. The assembly of claim 28 wherein the flat spring flexure comprises at least one flat spiral spring.

37. The assembly of claim 36 wherein the flat spiral spring comprises a first flexure bearing assembly supported by the laminated stator along a first end, and a second flexure bearing assembly supported adjacent a second end of the laminated stator, the first and second flexure bearing assemblies configured to support the axial member for accurate axial reciprocation relative to the body.

38. The assembly of claim 28 wherein the axial member comprises a moving portion of an alternator and a piston, in operation the piston being driven for reciprocation via cyclic pressure oscillations produced by working gas acting against the piston.

39. The assembly of claim 28 further comprising a mounting ring interposed between the flexure and the laminated stator so as to form a flexure bearing assembly, the mounting ring being constructed and arranged to carry the flexure bearing assembly and the laminated stator in mounted relation therebetween.

* * * * *

UNITED STATES PATENT AND TRADEMARK OFFICE

CERTIFICATE OF CORRECTION

PATENT NO. : 5,920,133

DATED : July 6, 1999

INVENTOR(S) : Laurence B. Penswick, et al.

It is certified that error appears in the above-identified patent and that said Letters Patent is hereby corrected as shown below:

Col. 2, line 23, delete "has a complex", and insert --has complex--.

Col. 5, line 21, delete "now U.S. Pat. No. ___", and insert --now U.S. Pat. No. 5,743,091--.

Col. 7, line 23, after "entitled" and before "Assemblies", insert --Heater Head and Regenerator--.

Col. 8, line 15, after "in the bottom", insert --of--.

Col. 9, line 44, delete "such clearance gaps".

Col. 10, line 56, delete "the machines are", and insert --the rings are--.

Col. 14, line 49, delete "kerf 194 extending", and insert --kerfs 194 extending--.

Col. 17, line 25,. delete "Additionally, thread", and insert --Additionally, threaded--.

Signed and Sealed this

Fourth Day of April, 2000

*Attest:*

Q. TODD DICKINSON

*Attesting Officer*

*Director of Patents and Trademarks*